(12) United States Patent
Transier et al.

(10) Patent No.: US 11,151,178 B2
(45) Date of Patent: Oct. 19, 2021

(54) SELF-ADAPTING RESOURCE AWARE PHRASE INDEXES

(71) Applicant: SAP SE, Walldorf (DE)

(72) Inventors: Frederik Transier, Bammental (DE); Joern Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 16/220,633

(22) Filed: Dec. 14, 2018

(65) Prior Publication Data
US 2020/0192925 A1 Jun. 18, 2020

(51) Int. Cl.
| | |
|---|---|
| *G06F 16/33* | (2019.01) |
| *G06F 16/31* | (2019.01) |
| *G06F 16/335* | (2019.01) |
| *G06F 16/338* | (2019.01) |
| *G06F 40/242* | (2020.01) |

(52) U.S. Cl.
CPC ........ *G06F 16/3349* (2019.01); *G06F 16/319* (2019.01); *G06F 16/335* (2019.01); *G06F 16/338* (2019.01); *G06F 40/242* (2020.01)

(58) Field of Classification Search
CPC .. G06F 16/3349; G06F 40/242; G06F 16/319; G06F 16/335; G06F 16/338
See application file for complete search history.

(56) References Cited

U.S. PATENT DOCUMENTS

| | | | | |
|---|---|---|---|---|
| 5,685,003 A | * | 11/1997 | Peltonen | G06F 16/328 715/202 |
| 8,943,067 B1 | * | 1/2015 | Cao | G06F 16/93 707/741 |
| 2009/0055358 A1 | * | 2/2009 | Tomasic | G16B 30/00 |
| 2009/0164437 A1 | * | 6/2009 | Torbjornsen | G06F 16/319 |
| 2009/0287676 A1 | * | 11/2009 | Dasdan | G06F 16/338 |
| 2010/0082633 A1 | * | 4/2010 | Harbarth | G06F 16/81 707/741 |

(Continued)

OTHER PUBLICATIONS

NPL1: Transier, Frederik, and Peter Sanders. "Out of the box phrase indexing." International Symposium on String Processing and Information Retrieval. Springer, Berlin, Heidelberg, 2008, 12 Pages.*

(Continued)

*Primary Examiner* — Hicham Skhoun
(74) *Attorney, Agent, or Firm* — Mintz Levin Cohn Ferris Glovsky and Popeo, P.C.

(57) ABSTRACT

In one aspect, there is provided a method. The method may include adding a tuple phrase to a phrase index as part of a lazy creation of the phrase index. The adding may include adding the tuple phrase to a dictionary mapped to the phrase index, adding to the phrase index a document identifier and a positional information for the tuple phrase, and adapting a first threshold and a second threshold value, the first threshold representing a threshold lower estimate of query processing burden associated with a least burdensome tuple phrase in the dictionary and the second threshold representing a top estimate of query processing burden associated with a most burdensome tuple phrase in the dictionary. The method may further include sending a query response including a generated query result corresponding to the tuple phrase.

11 Claims, 13 Drawing Sheets

(56) References Cited

U.S. PATENT DOCUMENTS

| | | | | |
|---|---|---|---|---|
| 2010/0121838 A1* | 5/2010 | Tankovich | ............ | G06F 16/951 |
| | | | | 707/715 |
| 2016/0378769 A1* | 12/2016 | Hopcroft | ............... | G06F 16/316 |
| | | | | 707/730 |
| 2019/0179921 A1* | 6/2019 | Manoharan | ............. | A63F 13/85 |
| 2019/0370334 A1* | 12/2019 | Bhowmick | ............ | G06N 5/025 |

OTHER PUBLICATIONS

Transier, Frederik, and Peter Sanders. "Out of the box phrase indexing." International Symposium on String Processing and Information Retrieval. Springer, Berlin, Heidelberg, 2008, 12 Pages.

\* cited by examiner

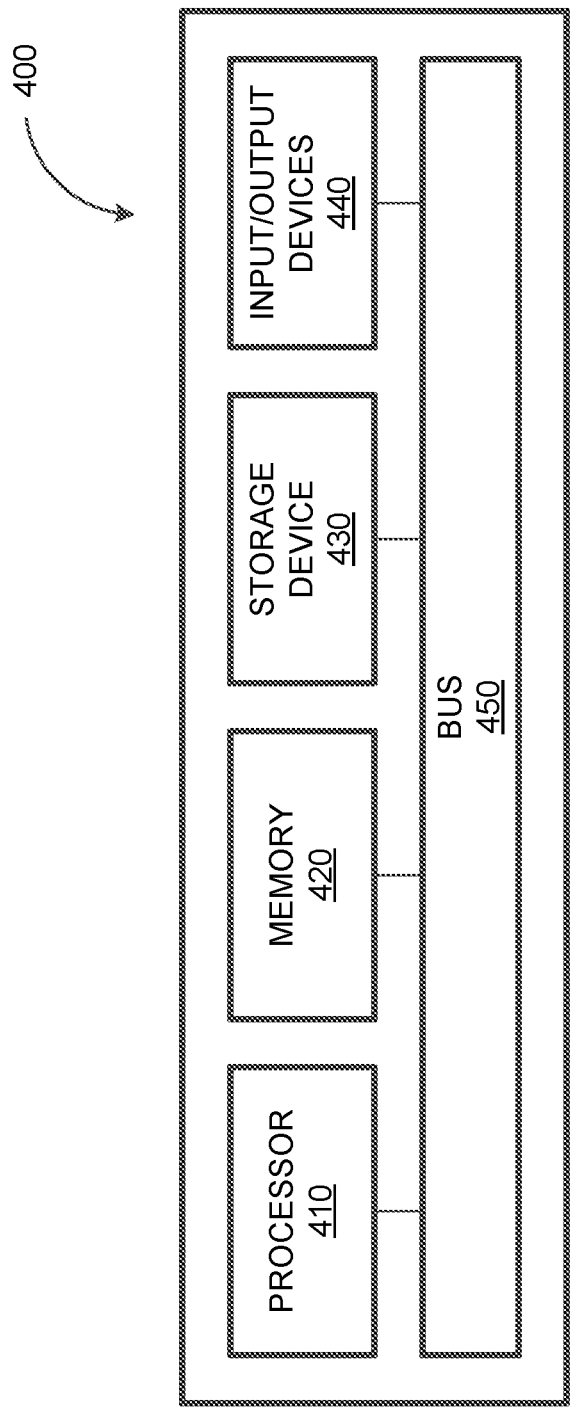

SELF-ADAPTING RESOURCE AWARE PHRASE INDEXES

TECHNICAL FIELD

The subject matter disclosed herein related to database queries including indexes.

BACKGROUND

An inverted index can provide mappings from the contents of a database to the corresponding locations in the database at which the contents are stored. For example, a typical inverted index can include a set of inverted lists. Each inverted list can be associated with a key representative of a data value such as a word and/or a number. Furthermore, each inverted list can enumerate the document identifiers of the individual records (e.g., rows, documents) in the database that contain the corresponding data values. Enriched inverted indices can provide additional information for each data value including, for example, statistics, language, part-of-speech, precise location, and/or the like.

SUMMARY

Systems, methods, and articles of manufacture, including computer program products, are provided for indexes. In one aspect, there is provided a method. The method may include adding a tuple phrase to a phrase index as part of a lazy creation of the phrase index. The adding may include adding the tuple phrase to a dictionary mapped to the phrase index, adding to the phrase index a document identifier and a positional information for the tuple phrase, and adapting a first threshold and a second threshold value, the first threshold representing a threshold lower estimate of query processing burden associated with a least burdensome tuple phrase in the dictionary and the second threshold representing a top estimate of query processing burden associated with a most burdensome tuple phrase in the dictionary. The method may further include sending a query response including a generated query result corresponding to the tuple phrase.

In some variations, one or more features disclosed herein including the following features may optionally be included in any feasible combination. A query including the tuple phrase may be received. The query result may be generated, and the query result may include a document identifier indicating a document containing the tuple phrase and positional information indicating where in the document the tuple phrase is located. The first threshold and the second threshold may be adapted over time as additional tuple phrases are received as part of the lazy creation of the dictionary and the phrase index. The first threshold and the second threshold may be adapted until the first threshold equals the second threshold. The first threshold and the second threshold may be equal, in which case the dictionary and the phrase index are in a static state. The tuple phrase may be added to the dictionary based on a determined query processing burden for the tuple phrase exceeding the first threshold. When a memory capacity of a storage containing the dictionary and/or the phrase index does not exceed a memory capacity parameter, the first threshold and the second threshold may be adapted based on the added tuple phrase. When the memory capacity of the storage containing the dictionary and/or the phrase index exceeds the memory capacity parameter exceeded, one or more tuple phrases may be removed from the dictionary until the memory capacity of the storage containing the dictionary does not exceed the memory capacity parameter.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 4 depicts a block diagram illustrating a computing system, in accordance with some example embodiments.

When practical, similar reference numbers denote similar structures, features, or elements.

DETAILED DESCRIPTION

An inverted index can be used to support efficient text search in databases. The inverted index holds a set of keywords. Each keyword is associated with an inverted list pointing to all the occurrences of the keyword in the database. As the inverted index provides the location of each keyword, the inverted index may also be used to quickly search for phrases. The phrase queries may require not only intersecting document-grained inverted lists but also comparing positional information for each keyword. In some instances, the inverted index may also use word-pair phrase indexes or larger word tuple phrase indexes to reduce the size and associated processing. In the case of word-pair phrase indexes for example, the inverted indexes use pairs of words as keys, and store where a particular word-pair appears as a consecutive sub-phrase in a document. Likewise, the inverted indexes may be expanded to include tuples of words (e.g., word tuples) as keys, and store where a particular word tuple appears as a consecutive sub-phrase in a database or document.

While phrase indexes may generally solve the problem of expensive phrase queries, the phrase indexes can have drawbacks at creation, or indexing, time as the phrase indexes may be costly and represent a processing burden with respect to processing time and query execution time, and/or the like.

In some example embodiments, there is provided a way to grow the inverted index. In some example embodiments, a lazy-creation approach may be provided for adding phrases to the inverted index. In the case of lazy creation of a phrase index, the phrases included in received queries are added to the phrase index as each query is received over time. Because the queries are added over time, it may be difficult to determine whether a given phrase should be added to the phrase index. Moreover, a memory threshold may be used to determine whether the phrase index is full (or not), and a cost function may be used to determine which phrases should be added.

But as the lazy creation of the phrase index is created over time, it may be more difficult to determine whether a given phrase (which is received in a query) should be added or not added (e.g., when the projected cost, such as query processing burden (e.g., query execution time, processing resources used, and/or the like) of adding a phrase exceeds a certain threshold). The subject matter disclosed herein provides a way to determine whether to add a given phrase to a phrase index in a lazy creation scenario.

Figure 1:
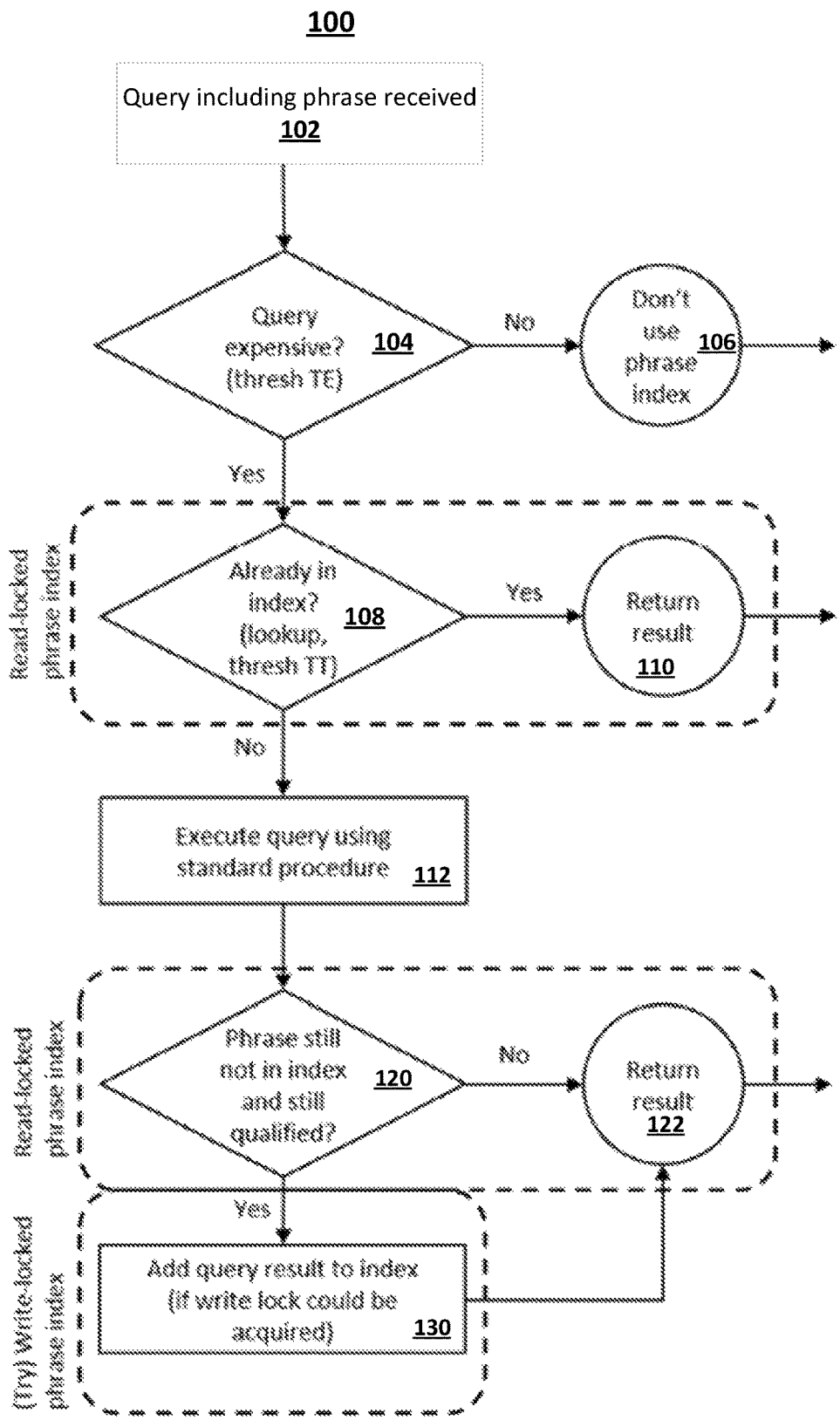
FIG. 1 depicts an example of a process for adding a word phrase to an index, in accordance with some example embodiments.

FIG. 1 depicts an example process 100 for adding a phrase to an index, in accordance with some example embodiments.

Initially it may be determined whether a query is expensive or not. A cost function may be evaluated on the query and the result may be compared with a threshold TE which is an estimation of how expensive queries need to be to qualify for being added to the phrase index. A goal (of a finalized phrase index) is to store the results of the k top most expensive queries, where k depends on the available or configurable amount of memory. In some implementations, TE may be initially set to a low constant value. If the query is not expensive enough, the query is answered, without accessing the phrase index. Otherwise, the process may proceed with looking up the query in the phrase index. In this phase the phrase index may be locked in a shared mode to avoid concurrent data manipulation. If the query is existing, the result is returned. If not, the query cost is compared with threshold TT (which marks the point where all queries having greater costs than TT are contained in the phrase index). This implies that queries with costs greater than TT that are not stored have an empty result. In the case where costs are lower than TT and the query was not found in the phrase index, the shared lock is released and the query is executed using the standard procedure (e.g., without accessing the phrase index.). Once the result is calculated, the query is again looked up in the phrase index under a shared lock. If the query was added (by a different thread) or the threshold TE was increased above the query's cost, the result may be returned immediately. Otherwise, the lock may be promoted to exclusive, the result may be stored, and thresholds (e.g., TE and TT) may be adjusted (e.g., adapted) as described herein. And, the result to the query may be returned.

At 102, a query including a phrase is received. For example, a query of a database may include a word tuple phrase, such as "exotic cars". The word phrase may be parsed from the query. During a lazy creation, the word tuple of the query may be evaluated to determine whether the phrase should be added to the inverted index.

If the phrase is not considered expensive (e.g., below a threshold estimate TE), the phrase may not added to the lazy creation phrase index (no at 104 and 106). For example, a word phrase may not be stored as it is likely easier (with respect to query processing burden, such as execution time associated with the word phrase) to just perform the query directly (e.g., without accessing the phrase index) rather than access an inverted index such as the phrase index. In the example of FIG. 1, the threshold TE may be set to represent the bottom threshold of what should be considered a candidate phrase for additional processing to add to the inverted index of tuple phrases. The threshold TE may thus be an estimation of how expensive queries need to be to qualify for being added to the phrase index.

If the phrase is considered expensive (e.g., above the threshold estimate TE), the phrase is checked, at 108, to determine whether the phrase is already in the phrase index. If the phrase is already in the phrase index, a result may be returned, such as the documents identifier values from the phrase index where the word phrase can be found (yes at 108 and 110). These results (for example, to a user interface or processor sending the query received at 102) may be returned as a response to the received query.

In some implementations, the phrase index may be locked to enable reads during the operations associated with 108 and 110, but unlocked before 112 is executed. In some implementations of process 100, the current top threshold, TT, value may be returned. The TT value represents the cost of the most expensive word phrase in the phrase index (which is an inverted index as noted). If this is an initial pass of the process 100, the TT value may be set as a predetermined TT value or a default value, but the TT value will be re-set as part of process 100 as noted below.

If however the word phrase is not already in the phrase index, the query including the word phrase may proceed to be executed at 112. For example, the query may be for a word phrase query of documents in a database. The query may search for the word phrase to identify one or more documents (or the document identifier values) including positional information for the word phrase.

At 120, the word phrase may be checked again to see if the word phrase is in the phrase index. If the word phrase is in the phrase index at this point in time (no at 120), the query result may be returned as explained at 110. In some implementations, the phrase index may locked to enable reads during the operations associated with 120 and 122, but promoted to an exclusive lock (e.g., write lock) before 130 is executed. The check at 120 may be needed in a parallel processing environment, in which case another query may have changed the index.

If the phrase is not the index at this point in time (yes at 120), the query result may be added at 130. For example, the query result, such as word phrase, document ID value(s) and positional information indicative of the position of the word phrase in the document(s), may be added to the phrase index and the result may be returned at 120. Process 200 (which is described further below) describes an example process for adding the query result to the phrase index.

In some implementations, the operation 130 is performed when a write lock can be acquired by the operation 130 to allow operation 130 to write the query result (e.g., documents including position information containing the phrase) to the phrase index.

Figure 2:
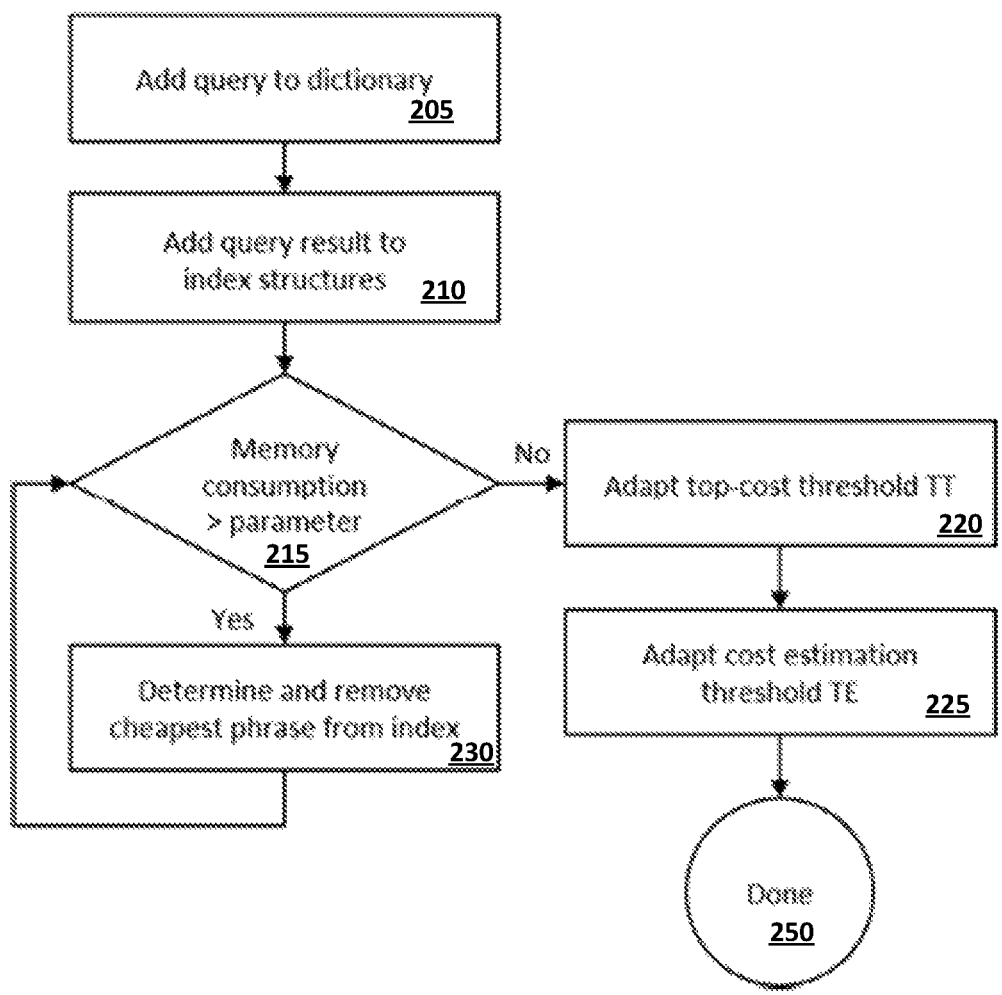
FIG. 2 depicts an example of process for adjusting thresholds related to the index, in accordance with some example embodiments.

FIG. 2 depicts an example process 200 for adding a query result phrase index as noted above at 130. As noted above, a query result may include a word phrase, one or more document identifiers indicating documents containing the word phrase, and/or positional information indicating for each document the location(s) of the word phrase in the document.

Adding new entries to the phrase index may need an exclusive lock during the addition. The query result may, as noted, be added to the dictionary that holds all indexed word phrases, and the dictionary entries point to the intermediate results, such as the phrase index (e.g., the inverted lists). The new result data may be mapped to the new dictionary item. After the new data has been incorporated, the phrase index may be reorganized, and the thresholds TE and TT may be adapted to represent the new state of the phrase index. In case of exceeding the predefined memory threshold, the cheapest word phrases may be removed from the phrase index until the target memory consumption is achieved. As a result, the threshold TT may be adapted (e.g., decreased). To adapt the TT threshold at 225, this may be performed by iterating through all possible word pairs (query phrases) with decreasing cost values beginning at the current TT (which may be initially set to a relatively large value such as infinity) and checking for the existence in the dictionary. If an entry could not be found in the dictionary, the iteration terminates. And, TT is set to the cost value of the query phrase which was be found last. Empty entries for phrases with cost values larger than TT may then be removed from dictionary (e.g., the TE and TT threshold check in the workflow of FIG. 1). Depending on the new memory consumption and the costs of the cheapest phrase in the index, TE may be adapted (which in most cases results in an increase).

The phrase index may be considered fully complete and in a static state once TE is equal to TT.

At 205, a query result may be added to a dictionary. For example, a word phrase may be added to a dictionary. Specifically, the word phrase added to the dictionary and point to the phrase index 320.

FIG. 3 depicts an example of a database including a dictionary of terms or phrases 305 having mappings 310 to the phrase index 320. In the example of FIG. 3, the phrase "He said" can be found in documents D1, D2, etc. And the positional information indicates that "He said" can be found in position "0" at document D1, and can be found in positon 1 at document D2. Likewise, the phrase "She said" can be found at documents D1 and D3, while the positional information indicates that "She said" can be found in position "4" at document D1, and can be found in positon 1 at document D3. In the example of FIG. 3, the phrase to be added is added, at 205, to the dictionary of terms.

Referring again to FIG. 2 as well as FIG. 3, the query result indicative of the documents and the positional information may be added, at 210, to the index structures. Supposing in the example of FIG. 3, the phrase "fast cars" is added to the dictionary 305, the corresponding additions to the phrase index (or indexes) may be made as well. For example, when the dictionary adds "fast cars" that is mapped 310 to at least one phrase index 320 and the phrase index structure is changed to include the addition of the phrase "fast cars" so in this example, the phrase index 310 structure is modified to add document D1 at position 10, the document D2 at position 101, etc.

At 215, if a memory consumption by the dictionary and/or the phrase index exceeds a certain threshold memory use parameter, the cheapest phrase in the phrase index is determined and then deleted from the phrase index (yes at 230 and 230). The actual memory consumption (of the complete index) may be used to decide whether the index can take further entries. For example, as the memory cost of the phrase index exceeds the threshold memory parameter (215), the word phrases that are cheaper in terms of a cost function may be deleted to make room for more expensive word phrases. The cost function is used to decide whether a phrase qualifies for the phrase index or not.

If the memory consumption does not exceed the threshold parameter (no at 215), the threshold value TT may be adjusted (or adapted) at 220 and the cost estimation threshold TE may be adjusted (e.g., adapted) at 225. To adapt the TT threshold at 225, this may be performed by iterating through all possible word pairs (query phrases) with decreasing cost values beginning at the current TT (initially set to infinity) and checking for the existence in the dictionary. If an entry could not be found in the dictionary the iteration terminates, and TT is set to the cost value of the query phrase which could be found last. Empty entries for phrases with cost values larger than TT can then be removed from dictionary. Depending on the new memory consumption and the costs of the cheapest phrase in the index, TE is adapted.

In some implementations, the phrase items which have sub-terms whose distribution, and hence inverted lists, have changed may be invalidated and removed from the phrase index. After that, the TT and TE thresholds may be adapted to match the new state. The phrase index is thus ready to be used (and populated with new data) as described above.

FIG. 3B-FIG. 3J depicts examples used to further illustrate the processes at FIG. 1 and FIG. 2. The descriptions of FIG. 3B-FIG. 3J also refer to FIG. 1 and FIG. 2.

Figure 3A:
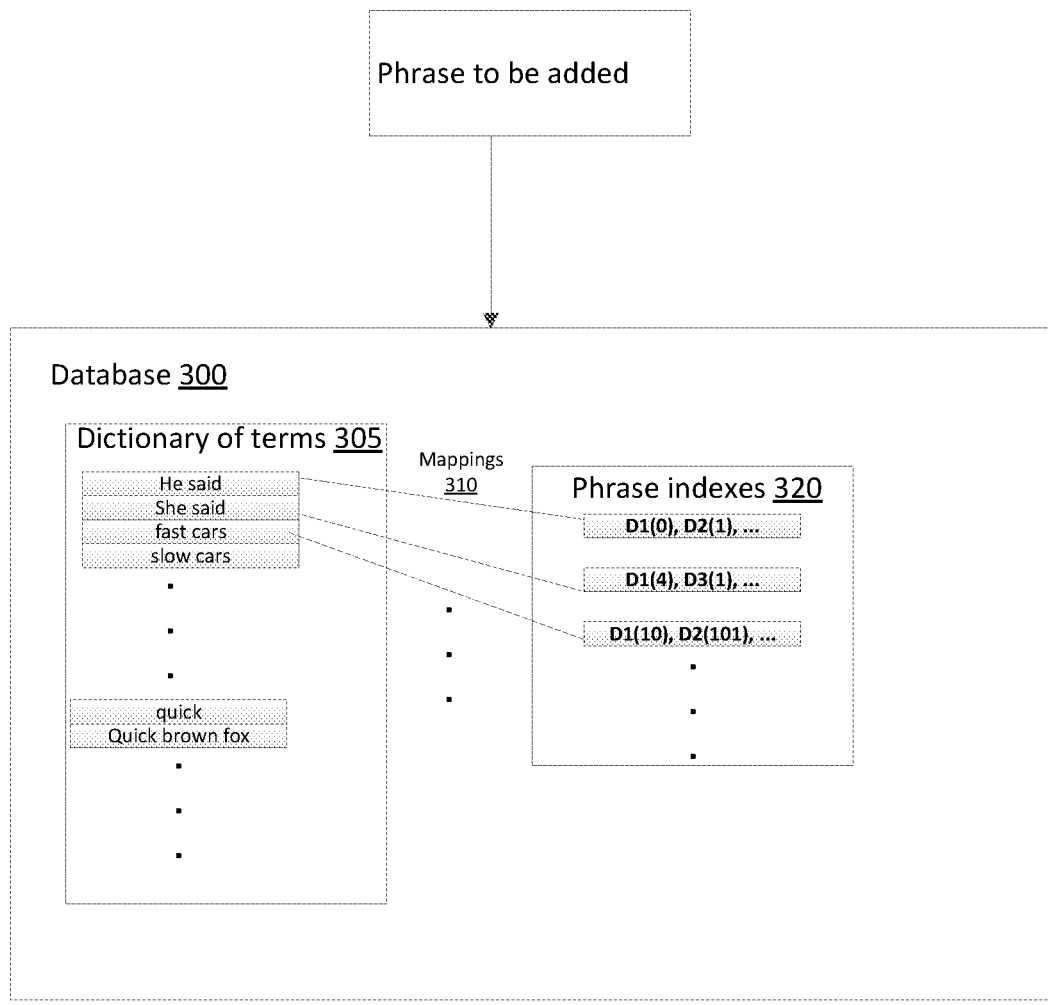
FIG. 3A depicts an example of a dictionary and a phrase index, in accordance with some example embodiments.
Figure 3B:
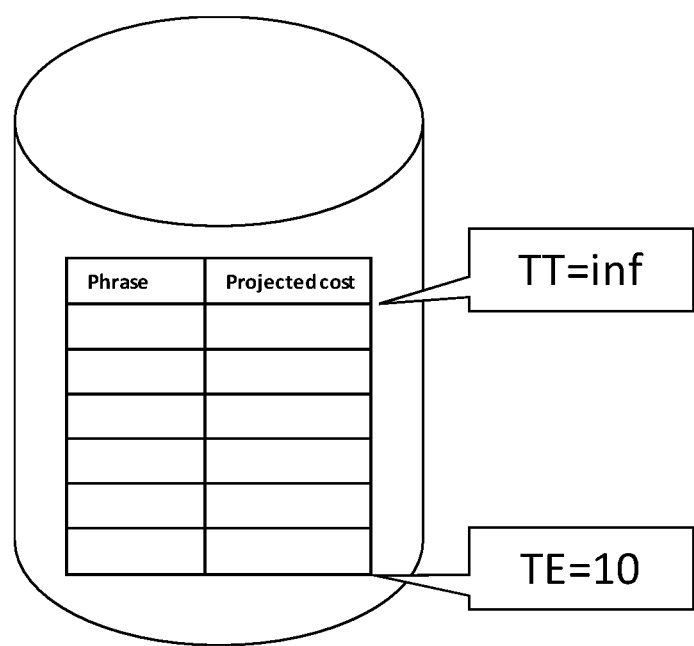
FIG. 3B-FIG. 3J depict examples related to adding a phrase to the index and updating in accordance with the processes at FIG. 2 and FIG. 3A.

FIG. 3B depicts an initial view of the index at the creation. At first TT may be set to a predetermined value, such as a high value (e.g., infinity) and TE is set to a small value, such as 10, for example.

Figure 3C:
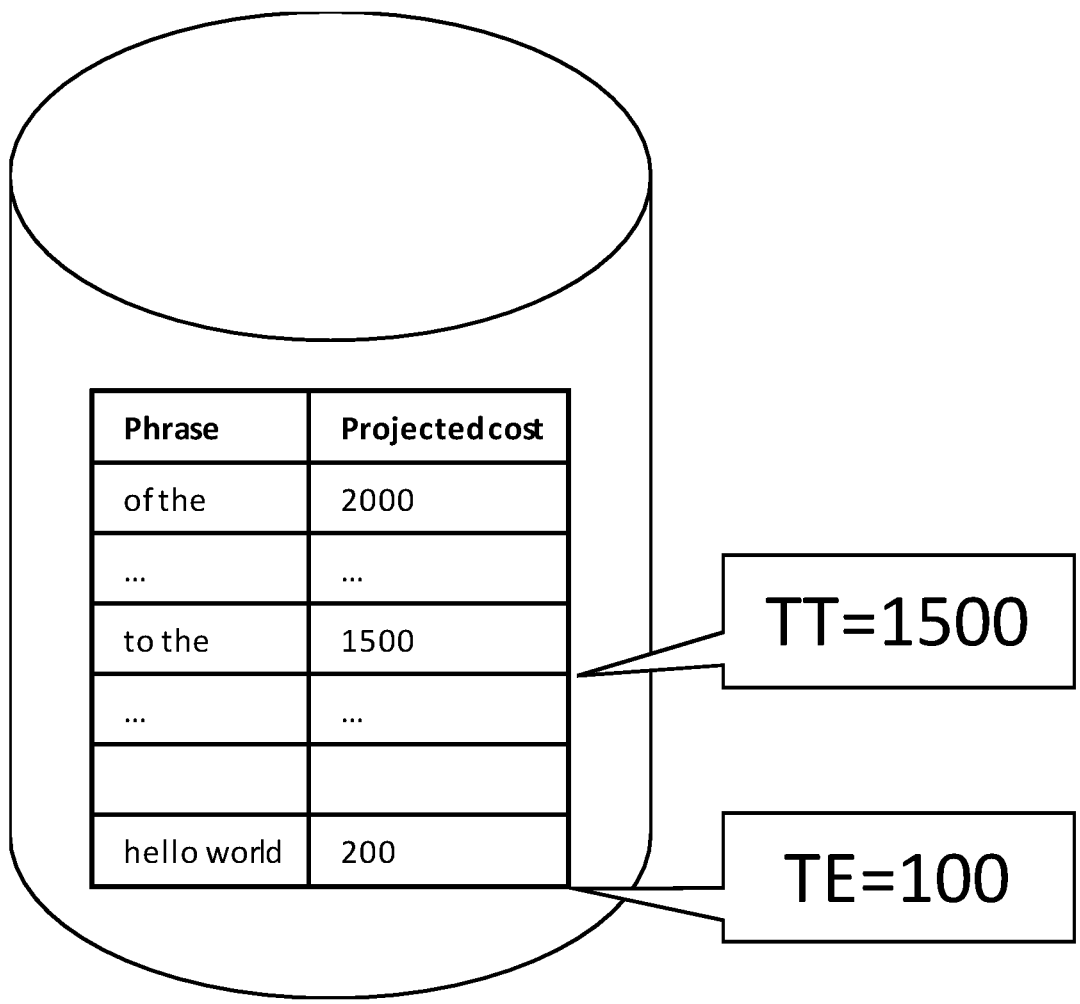

FIG. 3C depicts a snapshot look during lazy-creation. In this example, all possible phrases (which can be used in a query) with projected cost greater than TT and with a non-empty result are included in the index. This implies all other expensive query phrases (e.g., having costs greater than TT) with empty result may also be answered quickly. Query phrases with projected cost less than TE are not stored. Query phrases with cost between TE and TT are stored if they already appeared previously.

Figure 3D:
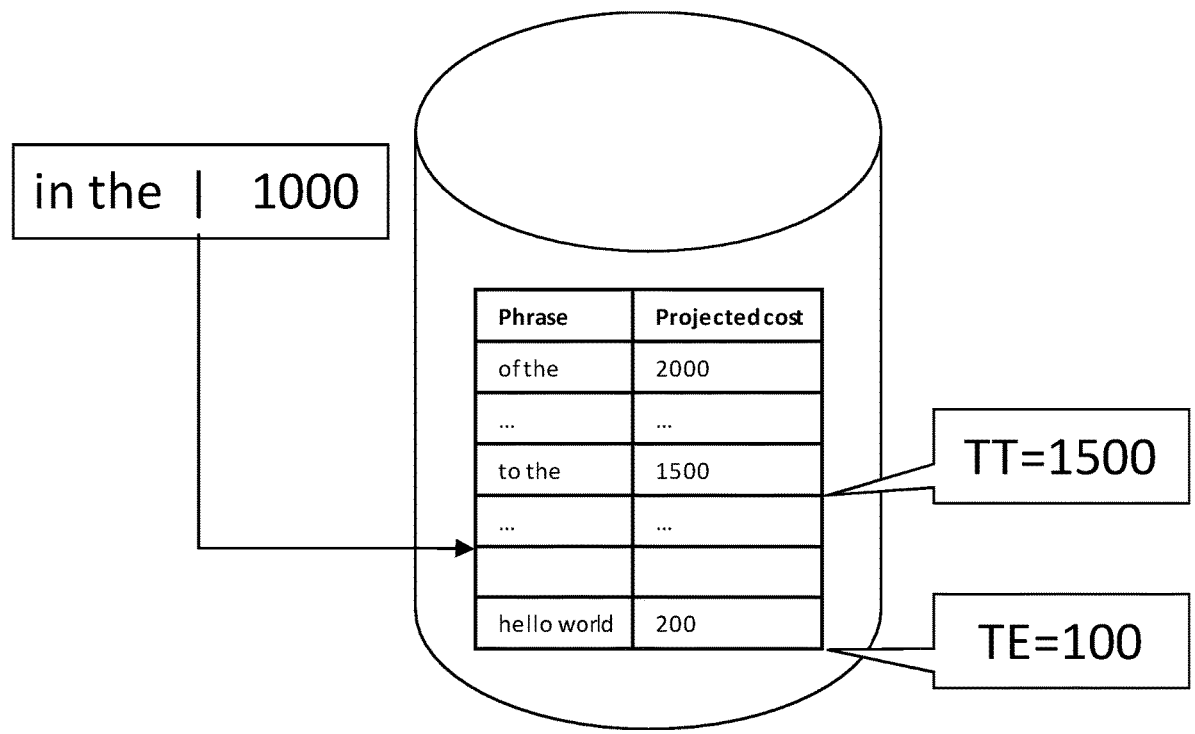

FIG. 3D depicts a new expensive query phrases (e.g., "in the") being received. Referring again to FIG. 1, processing may occur as noted at 102, 104, and 108 as the cost of this new phrase is 1000 which is greater than TE (which in this example is 100). When a result is determined at 112, the process proceeds to 120 and then 130 (see also FIG. 2). The key for the phrase (e.g., "in the") is added to the dictionary at 205. The result is added to the index at 210. The process proceeds to 215 and further to 220 as the index memory has not been exceeded in this example.

Figure 3E:
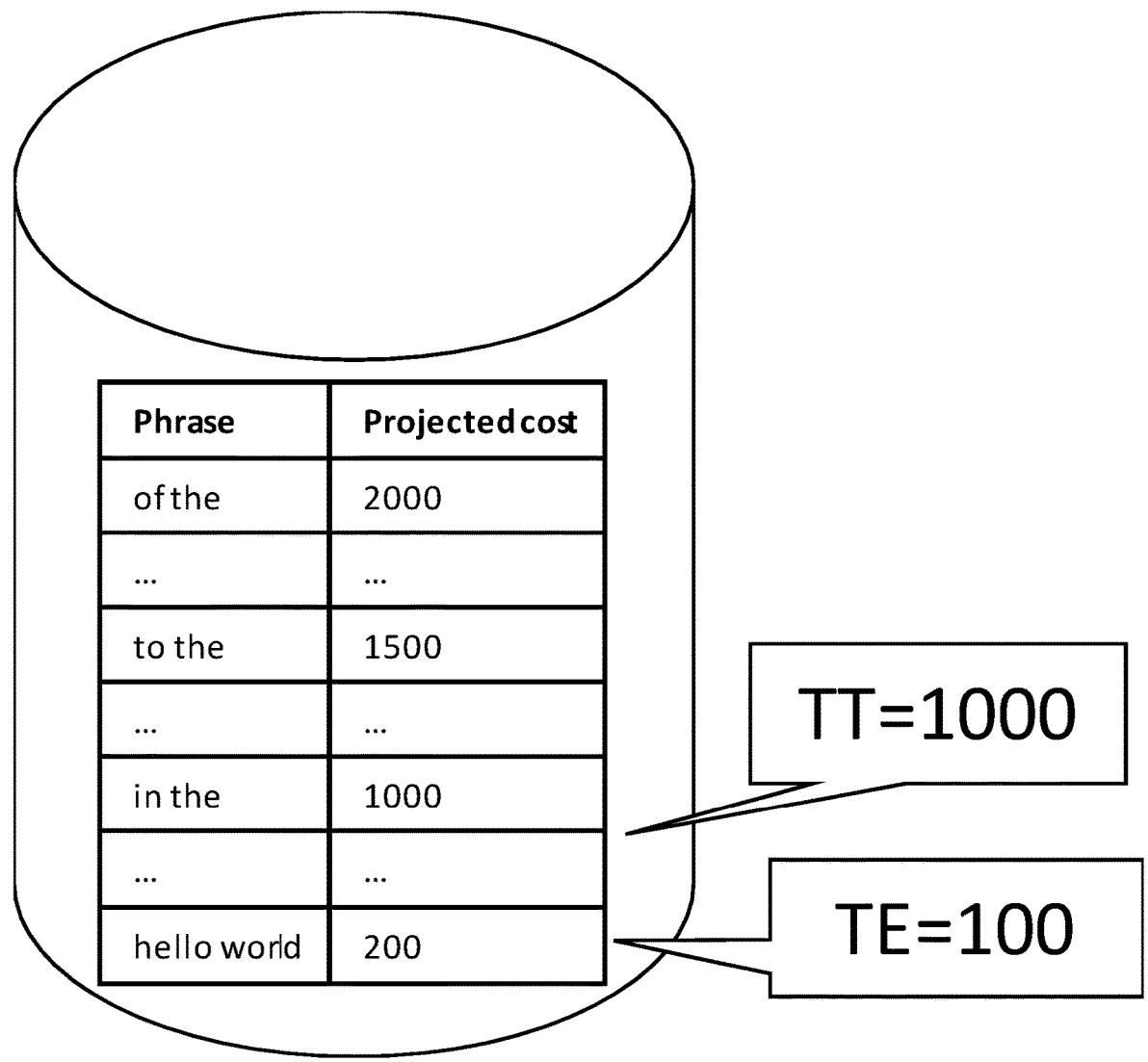

FIG. 3E depicts how TT is adapted. At 220, it is checked whether all query phrases with costs between 1000 and 1500 are contained in the index. This may be performed by iterating over all candidate query phrases with costs less than 1500 and greater than or equal to 1000. All possible candidates word pairs are known as the single words from the single word index are known. As such, TT is set to 1000 as all phrases with costs greater than or equal to 1000 are in the index. And, any index entries with empty results (e.g., TT greater than or equal to 100) may be are removed.

Figure 3F:
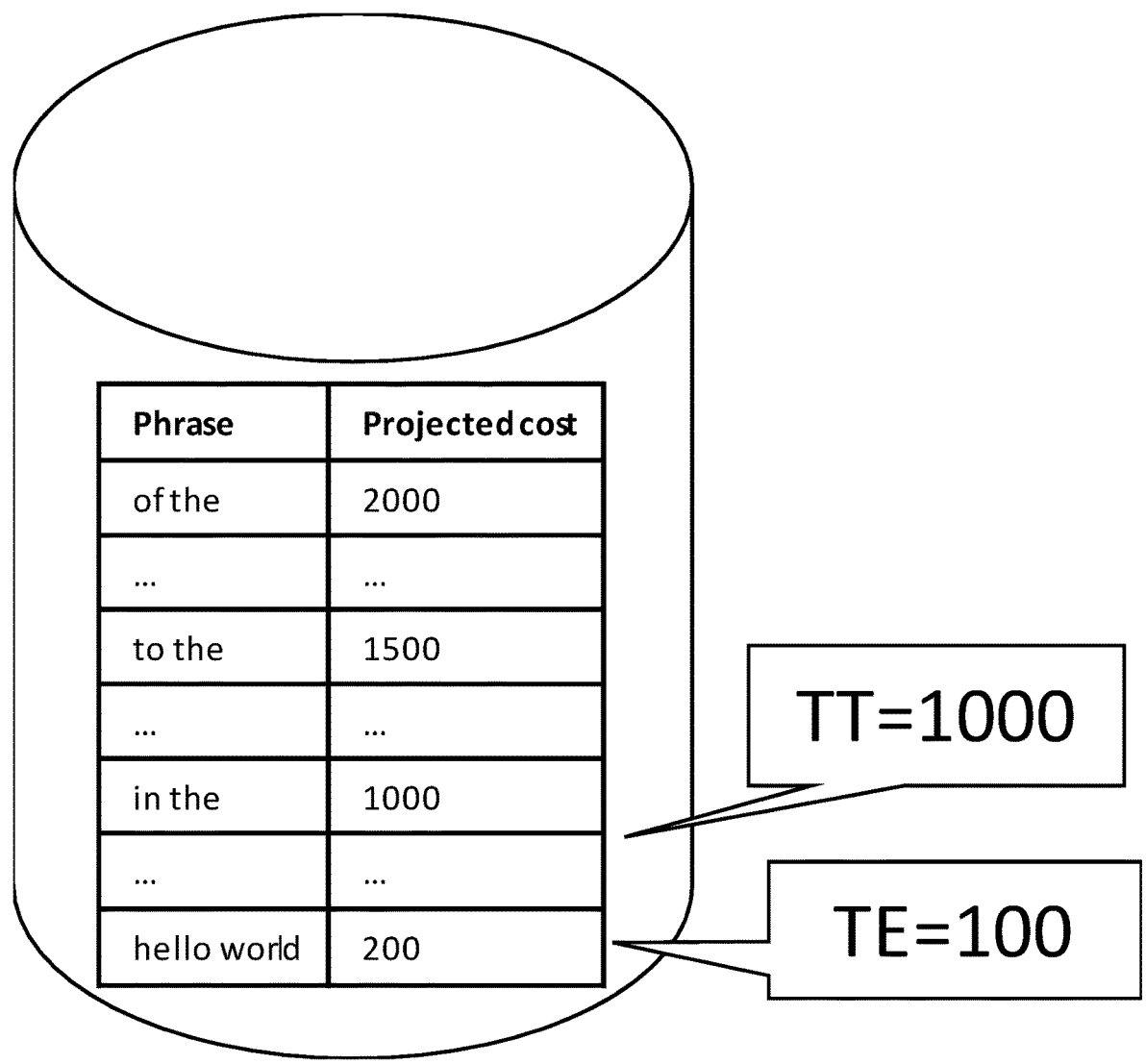

FIG. 3F depicts how TE is adapted. At 225, the TE is not modified because the cheapest index entries were not involved, so in this example the processing proceeds to 250.

Figure 3G:
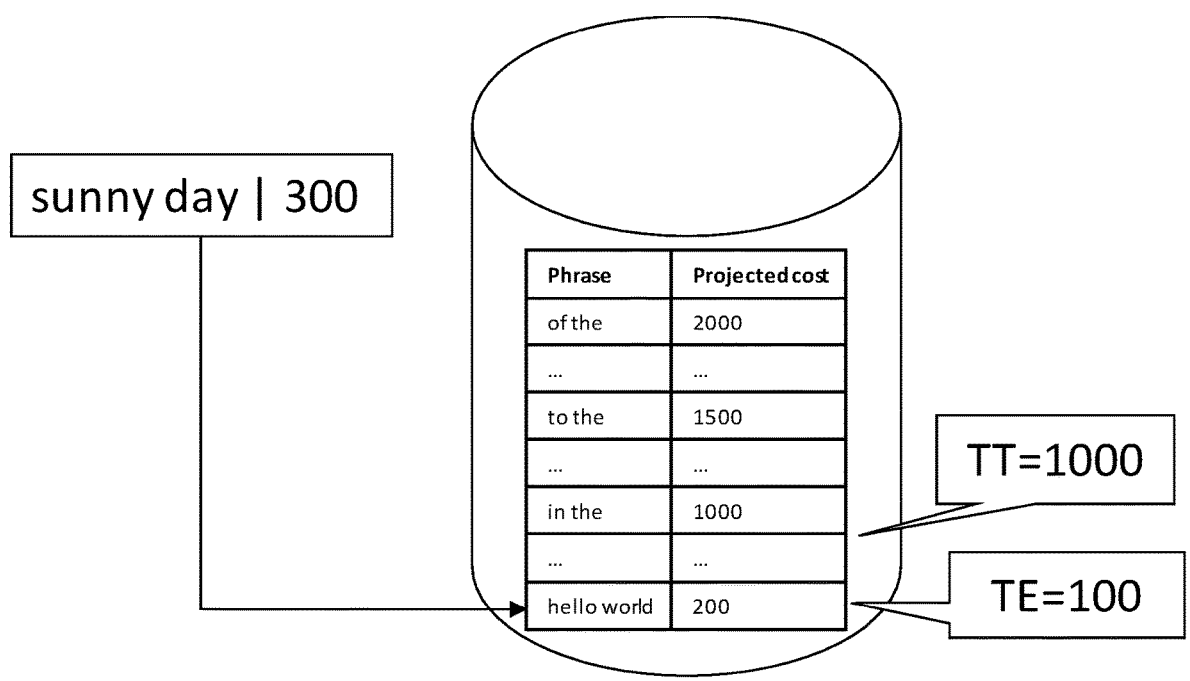
Figure 3H:
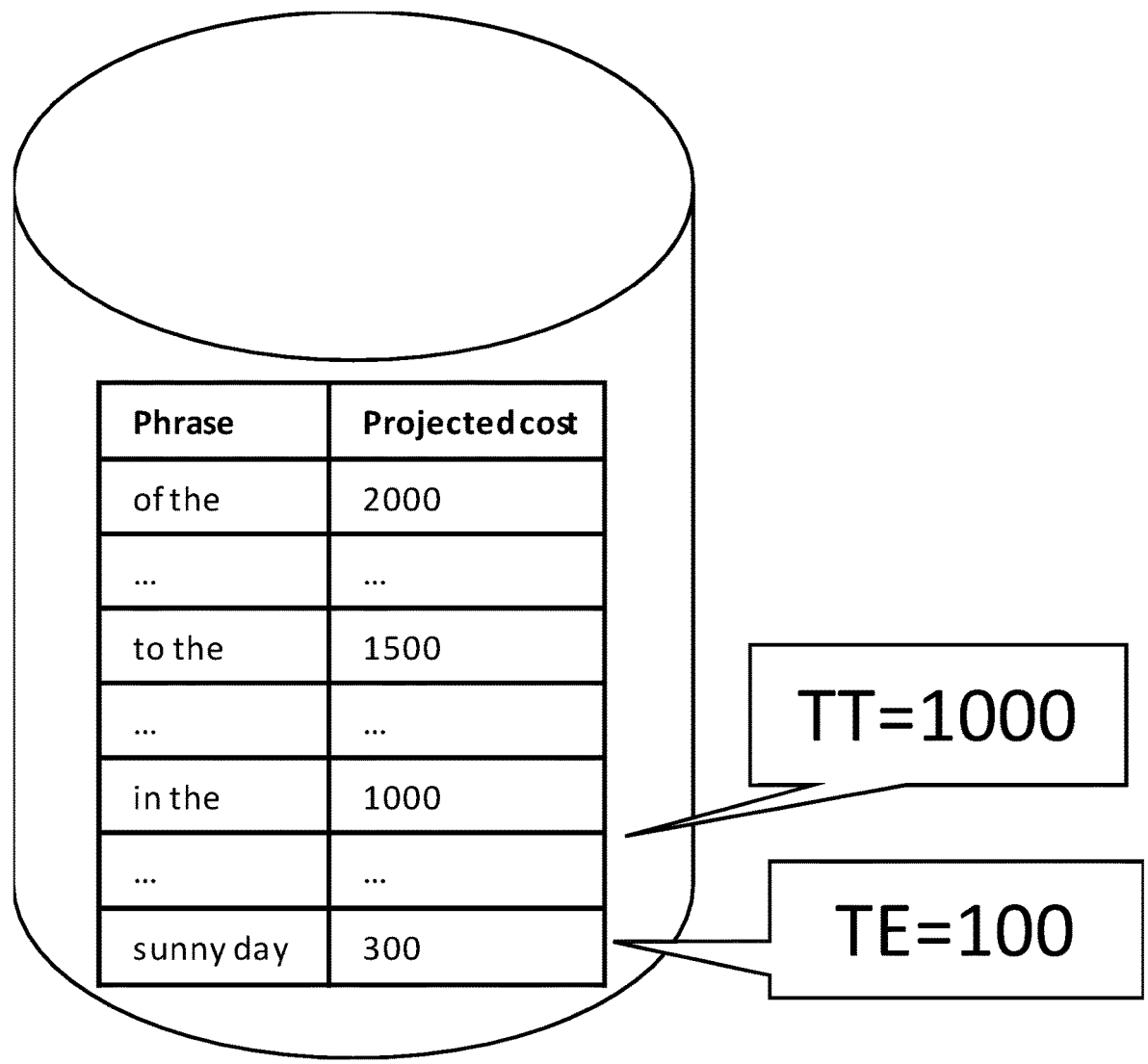
Figure 3I:
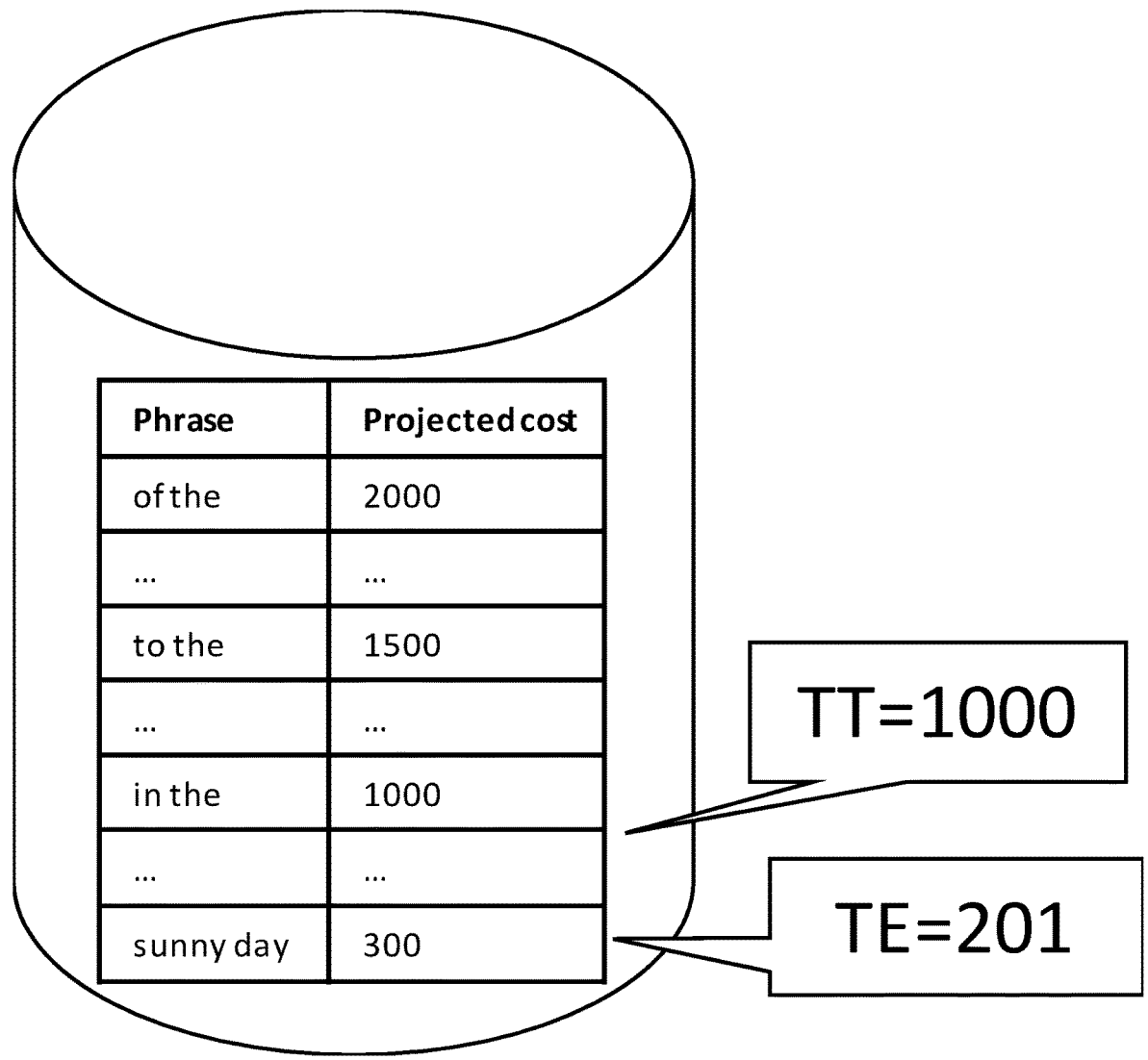
Figure 3J:
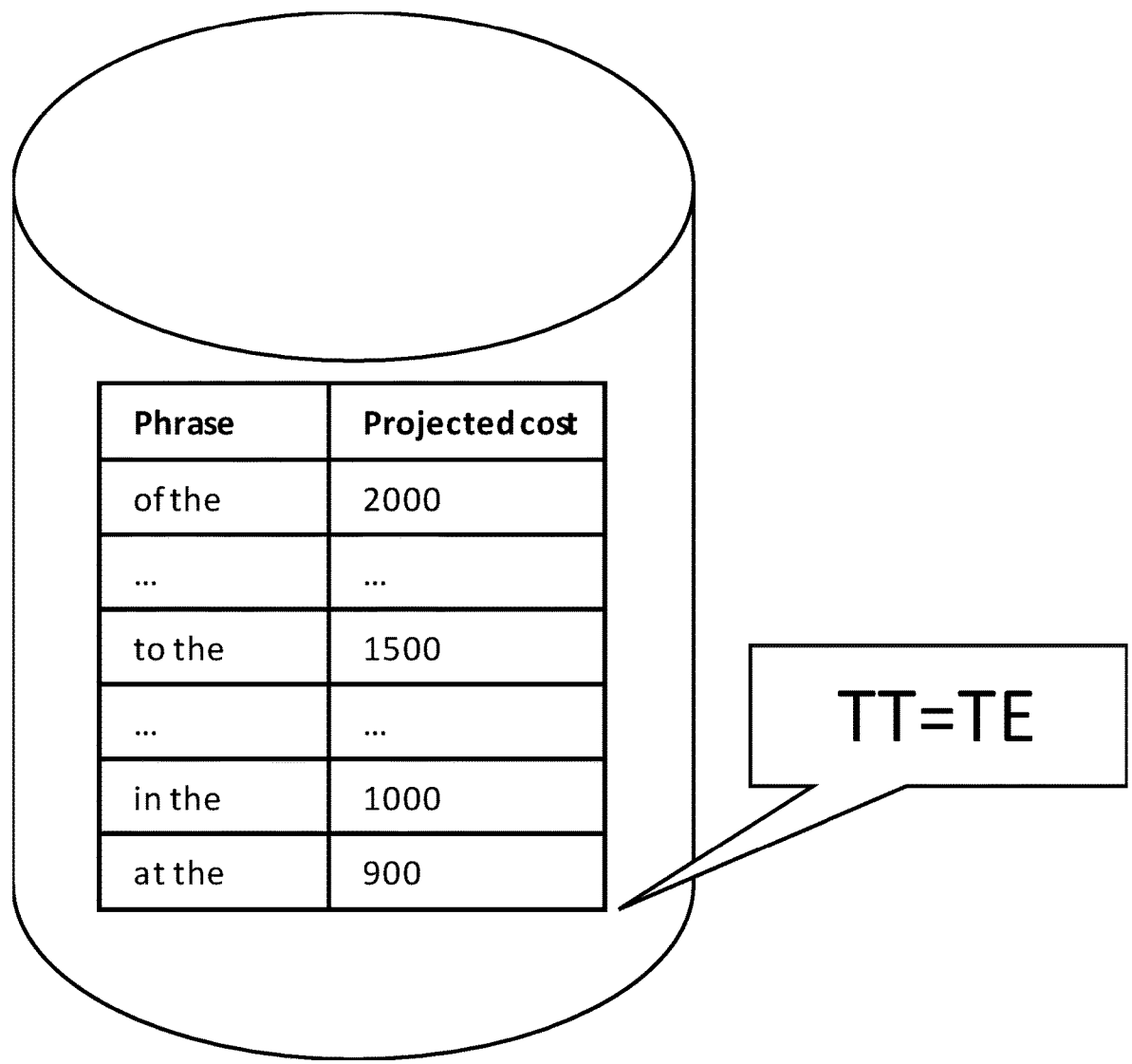

FIG. 3G depicts a new cheap phrase such as "sunny day" being received. The processing proceeds through 102, 104, 108 as the cost of 300 is greater than TE (which in this example is 100). The result is determined at 112, and then processing proceeds to 120 and 130 (see also FIG. 2). The key "sunny day" is added at 205 and the result added to the index at 210. The processing proceeds to the dictionary at 205. The result is added to the index at 210. And, the processing proceeds to 215 and then 230 as the index memory is exceeded in this example. As such, the cheapest entries are removed until it can proceed from 215 to 220. FIG. 3H shows that the TT is not modified at 220 because expensive phrases were not involved, so the process goes to 225. FIG. 3I depicts that at 225, TE is set to 201 which is +1 larger than the costs of the entry just removed as part of processing at 230. All entries with the same costs (which in this example is 200) may be removed, and processing may proceed to 250. FIG. 3J depicts an example of a completed phrase index. Here, TT is equal to TE (e.g., 900). There are no entries with empty results. All queries with costs greater than or equal to 900 can be answered by the phrase index. All queries with costs less than 900 do not qualify to be added to the phrase index.

FIG. 4 depicts a block diagram illustrating a computing system 500 consistent with implementations of the current subject matter. Referring to FIG. 1- FIG. 4, the computing system 400 can be used to implement the one or more aspects of process 100 or 200. For example, the system 400 may provide a host for the dictionary of terms, mappings, phrase index, etc. The system may provide a host for a computing device including a user interface where queries are formed and sent towards database 300.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the user interface controller 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, a tape device, a solid state device, and/or any other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis, and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving a database query including a tuple phrase;
   in response to receiving the database query, adding the tuple phrase to a phrase index as part of a lazy creation of the phrase index, wherein the lazy creation creates the phrase index over time as a plurality of queries, each of which includes a corresponding tuple phrase, are received, wherein the adding further comprises:
      in response to a determined database query processing burden for the tuple phrase exceeding a first threshold, adding the tuple phrase to a dictionary mapped to the phrase index,
      adding to the phrase index a document identifier and a positional information for the tuple phrase, and
      adapting the first threshold and a second threshold value as part of a lazy creation of the phrase index until the first threshold equals the second threshold, the first threshold representing a threshold lower estimate of database query processing burden associated with a least burdensome tuple phrase in the dictionary that is mapped to the phrase index and the second threshold representing a top estimate of database query processing burden associated with a most burdensome tuple phrase in the dictionary that is mapped to the phrase index, wherein when the first threshold and the second threshold are equal, the dictionary and the phrase index are in a static state; and
   sending a response including a generated database query result corresponding to the tuple phrase.

2. The method of claim 1 further comprising:
   generating the database query result including the document identifier indicating a document containing the tuple phrase and the positional information indicating where in the document the tuple phrase is located.

3. The method of claim 1, wherein the first threshold and the second threshold are adapted over time as additional tuple phrases are received as part of the lazy creation of the dictionary and the phrase index.

4. The method of claim 1, wherein the state represents the dictionary and the phrase index are complete.

5. The method of claim 1, wherein in response to adding the tuple phrase to the dictionary mapped to the phrase index and adding to the phrase index the document identifier and the positional information for the tuple phrase, the method further comprises:
   in response to a memory capacity for storing the dictionary and/or the phase index not exceeding a memory threshold parameter, adapting the first threshold and the second threshold value by increasing the first threshold and decreasing the second threshold; and
   in response to the memory capacity for storing the dictionary and/or the phase index exceeding the memory threshold parameter, removing one or more tuple phrases from the dictionary until the memory capacity does not exceed the memory threshold parameter.

6. A system comprising:
   at least one processor;
   at least one memory including program code which when executed by the at least one processor causes operations comprising:
      receiving a database query including a tuple phrase;

in response to receiving the database query, adding the tuple phrase to a phrase index as part of a lazy creation of the phrase index, wherein the lazy creation creates the phrase index over time as a plurality of queries, each of which includes a corresponding tuple phrase, are received, wherein the adding further comprises:

in response to a determined database query processing burden for the tuple phrase exceeding a first threshold, adding the tuple phrase to a dictionary mapped to the phrase index, adding to the phrase index a document identifier and a positional information for the tuple phrase, and adapting the first threshold and a second threshold value as part of a lazy creation of the phrase index until the first threshold equals the second threshold, the first threshold representing a threshold lower estimate of database query processing burden associated with a least burdensome tuple phrase in the dictionary that is mapped to the phrase index and the second threshold representing a top estimate of database query processing burden associated with a most burdensome tuple phrase in the dictionary that is mapped to the phrase index, wherein when the first threshold and the second threshold are equal, the dictionary and the phrase index are in a static state; and sending a response including a generated database query result corresponding to the tuple phrase.

7. The system of claim 6 further comprising:

generating the database query result including the document identifier indicating a document containing the tuple phrase and the positional information indicating where in the document the tuple phrase is located.

8. The system of claim 6, wherein the first threshold and the second threshold are adapted over time as additional tuple phrases are received as part of the lazy creation of the dictionary and the phrase index.

9. The system of claim 6, wherein the static state represents the dictionary and the phrase index are complete.

10. The system of claim 6, wherein in response to adding the tuple phrase to the dictionary mapped to the phrase index and adding to the phrase index the document identifier and the positional information for the tuple phrase, the method further comprises:

in response to a memory capacity for storing the dictionary and/or the phase index not exceeding a memory threshold parameter, adapting the first threshold and the second threshold value by increasing the first threshold and decreasing the second threshold; and in response to the memory capacity for storing the dictionary and/or the phase index exceeding the memory threshold parameter, removing one or more tuple phrases from the dictionary until the memory capacity does not exceed the memory threshold parameter.

11. A non-transitory computer-readable storage medium including program code which when executed by the at least one processor causes operations comprising:

receiving a database query including a tuple phrase;

in response to receiving the database query, adding the tuple phrase to a phrase index as part of a lazy creation of the phrase index, wherein the lazy creation creates the phrase index over time as a plurality of queries, each of which includes a corresponding tuple phrase, are received, wherein the adding further comprises:

in response to a determined database query processing burden for the tuple phrase exceeding a first threshold, adding the tuple phrase to a dictionary mapped to the phrase index, adding to the phrase index a document identifier and a positional information for the tuple phrase, and adapting the first threshold and a second threshold value as part of a lazy creation of the phrase index until the first threshold equals the second threshold, the first threshold representing a threshold lower estimate of database query processing burden associated with a least burdensome tuple phrase in the dictionary that is mapped to the phrase index and the second threshold representing a top estimate of database query processing burden associated with a most burdensome tuple phrase in the dictionary that is mapped to the phrase index, wherein when the first threshold and the second threshold are equal, the dictionary and the phrase index are in a static state; and sending a response including a generated database query result corresponding to the tuple phrase.

* * * * *